United States Patent [19]

Wu et al.

[11] Patent Number: 4,864,726
[45] Date of Patent: Sep. 12, 1989

[54] AUXILIARY EQUIPMENT OF CUTTER FOR COMMUNICATION CABLES

[75] Inventors: Chia-Hsien Wu; Show-Zone Chuang; Wei-Shyan Chien; Teng-Chih Feng, all of Tao Yuan Hsien, Taiwan

[73] Assignee: Telecommunications Laboratories, Directorate General of Telecommunications, Ministry of Communications, Taiwan

[21] Appl. No.: 104,043

[22] Filed: Oct. 2, 1987

[51] Int. Cl.[4] .............................................. H02G 1/12
[52] U.S. Cl. ........................................ 30/90.1; 30/102
[58] Field of Search ................... 81/9.4; 30/90.1, 90.2, 30/90.3, 92, 93, 94, 95, 96, 97, 101, 102

[56] References Cited

U.S. PATENT DOCUMENTS 4,625,464 12/1986 Kubo ....................................... 30/92

FOREIGN PATENT DOCUMENTS 2416934 11/1974 Fed. Rep. of Germany ....... 30/90.1
831098 3/1960 United Kingdom .................... 30/97

Primary Examiner—Roscoe V. Parker
Attorney, Agent, or Firm—Wenderoth, Lind & Ponack

[57] ABSTRACT

An auxiliary cutter for precisely cutting through the outer covering of a cable without damaging the inner core is removably attachable to a grinder. An optical cable or electrical cable is fixedly held in a bearing by a fixing ring. A portable grinder is detachably attached to the cutting attachment or the auxiliary cutter to provide a cutting blade. Additional connecting parts enable the auxiliary cutter to rotate 360° relative to the central axis of the cable for cutting entirely the outer surface of the cable being cut. The cutting depth can be adjusted and set by an adjustable screw which fixes the distance between the edge of the cutting blade or wheel of the grinder and the central axis of the cable being cut. A compression spring presses the outer covering of the cable against the grinder cutting blade for cutting the outer covering of the optical cable or electrical cable up to the present cutting depth. Consequently, the outer surface or covering of the optical cable or electrical cable will be cut without any damage to the core of the cable.

2 Claims, 3 Drawing Sheets

AUXILIARY EQUIPMENT OF CUTTER FOR COMMUNICATION CABLES

BACKGROUND OF THE INVENTION

In order to protect optical fibers or copper wires of optical cables or electrical cables, respectively, from various factors, such as tension, compression, impacts, corrosion, moisture penetration, and the like, the outer surface of the cable is usually enclosed by very tough and tensile material, such as medium or high density polyethylene, copper, steel, aluminum, and REP (reinforced plastics). The American Telephone & Telegraph (A.T.&T.) for example, adopts high density polyethylene and steel wire to enclose as outer constructive material to protect optical fiber cores. At present the tools for workers to strip the outer material of communication cables are very complicated. Most of such tools are conventional tools which can be bought in hardware store such as pliers, cutting knives, saws, cable scissors, and the like. The following drawbacks arise when such tools are used to strip the stiff outer enclosure material off cables: the workers are easily hurt; too many kinds of tools are utilized; waste of time and strength of the workers; and the optical fiber or copper conductor wire is easily damaged.

SUMMARY OF THE INVENTION

The present invention relates to an auxiliary cutter for cutting communication cables that fixes optical cables or electrical cables along their axes by use of a fixing ring. A cutting blade is provided by a detachable portable grinder. The auxiliary cutter and grinder are connected in use. Other structure is provided on the auxiliary cutter to enable the optical cable or electrical cable to rotate in order for the outer casing to be cut in a full 360° around the center core of the cable. The cutting depth can be adjusted by screw which adjusts the distance between the center of the optical cable or electrical cable and the edge of the cutter (cutting wheel) of the grinder. The optical cable or electrical cable is pressed to a fixed cutting depth by a compression spring. The above structure achieves the objective of stripping the outer surface of a cable without any damage to the optical fiber core or to the copper conductor.

DETAILED DESCRIPTION

The inventor engages in research of the mechanical characteristics of optical fiber cables, has spent a long time testing and researching various cutting tools to ease the burden of workers in the laboratory and factory. The resulting increased efficiency is attributable to the inventor's research. Besides improving over the defects of the conventional cutting tools, the present invention also can be operated just by one person to finish the work in a very short time. Hereinafter is a detailed description of the present invention.

(A) The effect and characteristics of the instant cable cutter are:

(1) It is portable and can be operated by one person without coordinating the operation of another machine during the cutting operation.

(2) The cutting depth can be adjusted to prevent the core of the optical fiber or copper conductor from being damaged.

(3) After the optical fiber cable or electrical cable is positioned it can not be rotated, yet the present invention can rotate through 360° relative to the fixed optical fiber cable or electrical cable in order to cut the outer enclosure of the cable around its entire circumference.

(4) Time required for the cutting operation of the present invention is less than that of the conventional operation; e.g., it is estimated to take about 4 hours for an unskilled worker to strip the outer surface of an A.T.&T. optical cable in the conventional way; and even a skilled worker has needed over one hour. But if one uses the auxiliary cutting equipment of the present invention, even an unskilled worker who has never used the machine previously can finish the work in one minute (after some initial training).

(5) The grinder of the present auxiliary cutting equipment has been enclosed except for the part for cutting the optical cable or electrical cable, so reliable safety during operation is provided.

(6) The auxiliary equipment for cutter suits for any size of the conventional portable grinder.

Figure 1:
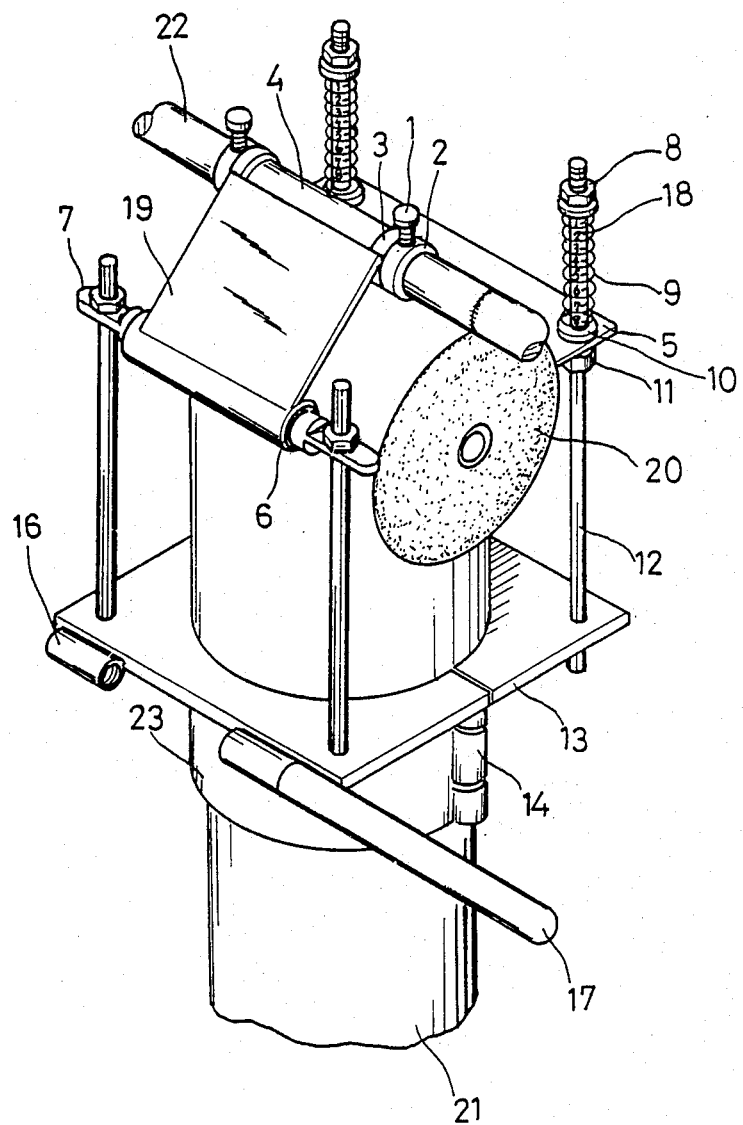
FIG. 1 is a front prospective view of the present invention.
Figure 2:
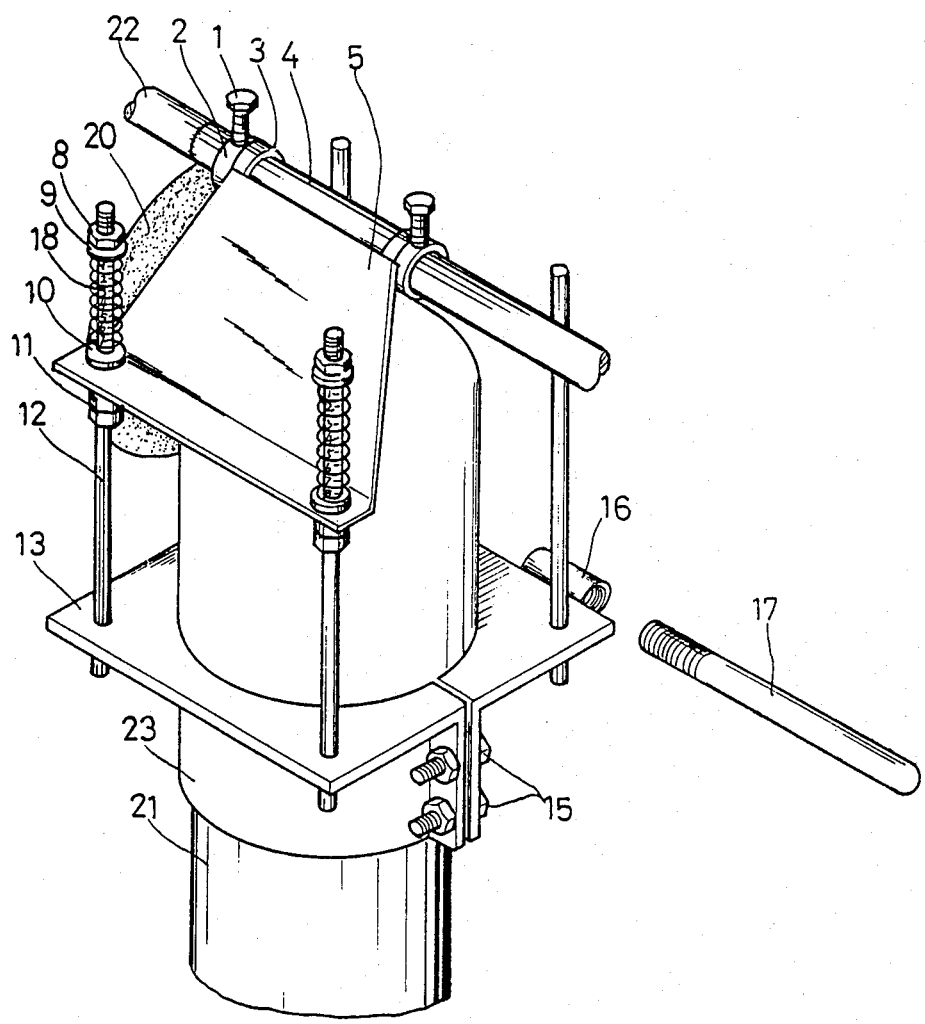
FIG. 2 is a rear prospective view of the present invention as shown in FIG. 1.
Figure 3:
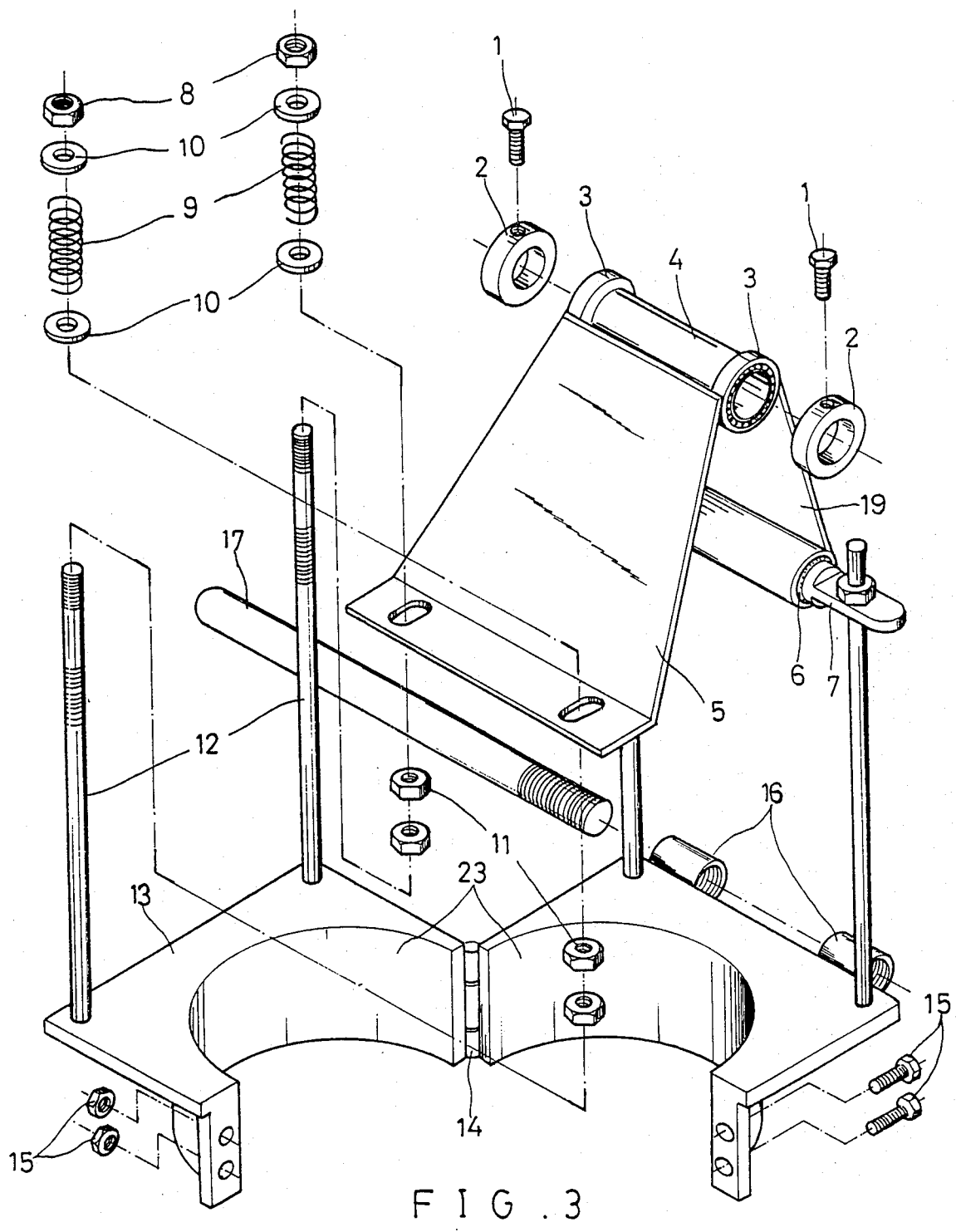
FIG. 3 is an exploded view of the present invention as shown in FIGS. 1 and 2.

(B) Detailed description of the structure:

The present invention includes a bottom base, a fixing installation for optical cables or electrical cables, and an adjustment installation for adjusting and setting the cutting depth. A detailed description of the structure of the present invention with reference to FIGS. 1, 2 and 3 is as follows.

The function of the bottom base 13 is as the bottom part of the fixing installation for optical fiber cables or electrical cables and an adjustment installation for setting the cutting depth. The base also connects the two installations and the grinder 21 by means of a clip ring 23 which fixedly mounts on the grinder 21. The rotatable axis defined by hinge 14, along with the fixing screw nut 15 of the clip ring, enable the whole installation to stably mount on the grinder. Because it is easy to be assembled and separated, the grinder 21 also can be used for any other purpose at any time.

The present invention can rotate through 360° relative to the central axis of the optical cable or the electrical cable 22 because the roller bearing 3 are used to engage the cable. The fixing ring 2 and the fixing screw 1 fix the cutting position of the optical cable or electrical cable to prevent it from vibrating during cutting. The duct or guide tube 4 for receiving a cable connects two roller bearings 3 and enables optical cables or electrical cables to pass through the fixing installation easily. The roller bearing is welded between the connecting plate 19 and the adjustable connecting plate 5. The connecting plate is fixed on the bottom base 13 by flexible axis 7 and framing rod 12. Because of the flexible axis, the distance between the optical cable or electrical cable and the cutter 20 of the grinder 21 can be adjusted. In addition, the flexible axis is fixed by a typical electric clip 6 to prevent it from vibrating.

The function of the installation for cutting depth adjustment is to adjust the radial depth, to control the cut in the outer surface of the cable and to prevent the core of the optical cable or electrical cable from being damaged. The method of adjustment is to adjust a first screw type threaded nut 11 to fix the cutting depth, a second nut is abutted against the first, and the two screw nuts 11 are screwed tightly against each other to prevent the position of the first nut from being changed by vibration during operation of the cutter. During operation a compressive spring 9 presses against the adjustable connecting plate 5 to push the roller bearing 3 downwardly to press the optical cable or electrical cable close to and against the cutter of the grinder for cutting through the outer covering of the cable until the adjustable connecting plate 5 touches the first adjustable screw 11. The contact of the adjustable connecting plate 5 against the first adjustable cutting depth fixing screw 11 prevents further cutting of the outer cable covering. The strength of compressive force of the spring can be varied by adjusting the screw nut 8 and the base ring 10, which press the adjustable connective plate 5 to touch the adjustable screw. In addition, adjustable connecting plate 5 can be raised easily with one hand in order to fix or separate the optical cable or electrical cable. There is a scale 18 on the framing rod 12 as a guide for adjustment of the cutting depth.

There is a handle sleeve 16 fixed on the bottom base 13 to which a handle 17 can be assembled on either left side or right side, thus enabling the operation to be easier.

We claim:

1. A cutter for cutting the outer covering on cables, said cutter comprising:

a main body;

an attaching means on said main body for detachably attaching said main body to a grinder of the type having a rotary cutting wheel;

a guide tube for receiving a cable therethrough, said guide tube being rotatably attached to said main body for moving a cable received therein relative to a cutting wheel of a grinder when a grinder is detachably attached to said main body;

biasing means for biasing said guide tube for forcing a cable received in said guide tube against a cutting wheel of a grinder for cutting the outer covering of a cable when a grinder is detachably attached to said main body of said cutter; and adjustable stop means for limiting the degree of rotation of said guide tube relative to said body for determining the depth of cut of a cutting wheel of a grinder in an outer covering of a cable received in said guide tube when said biasing means forces a cable received in said guide tube against a cutting wheel when a grinder is detachably attached to said main body of said cutter and said biasing means forces said guide tube to rotate.

2. An apparatus as in claim 1, wherein said guide tube includes roller bearings for rotatably supporting a cable received therethrough, said biasing means includes force adjustment means for adjusting the biasing force of said biasing means, and a pair of fixing rings are disposed adjacent said guide tube, each one said pair of fixing rings having means for receiving a cable therethrough and for releasably holding a cable for preventing longitudinal axial movement of a cable received in said guide tube for fixing a cutting position of a cable.

* * * * *